(12) United States Patent
Sherman et al.

(10) Patent No.: US 6,513,456 B2
(45) Date of Patent: Feb. 4, 2003

(54) MULTI-USE PET ENVIRONMENT

(75) Inventors: Alan Sherman, 7639 Westmoreland Ave., St. Louis County, MO (US) 63105; Wells Bearinger, St. Louis County, MO (US); Neil Koenig, St. Louis County, MO (US)

(73) Assignee: Alan Sherman, St. Louis, MO (US)

( * ) Notice: Subject to any disclaimer, the term of this patent is extended or adjusted under 35 U.S.C. 154(b) by 0 days.

(21) Appl. No.: 09/772,704

(22) Filed: Jan. 30, 2001

(65) Prior Publication Data

US 2002/0100431 A1 Aug. 1, 2002

(51) Int. Cl.$^7$ .............................................. A01K 1/03
(52) U.S. Cl. ...................... 119/499; 119/498
(58) Field of Search ................. 119/499, 501, 119/502, 516, 484, 482, 481, 473, 453, 452, 427, 417, 416

(56) References Cited

U.S. PATENT DOCUMENTS

| | | | | |
|---|---|---|---|---|
| 1,107,871 A | * | 8/1914 | Alkire et al. ............... | 119/499 |
| 2,079,458 A | * | 5/1937 | Leichtfuss ................. | 119/497 |
| 2,470,223 A | * | 5/1949 | Powels ...................... | 119/497 |
| 3,122,127 A | * | 2/1964 | Shechmeister et al. ..... | 119/417 |
| 3,735,735 A | * | 5/1973 | Noroian ....................... | 119/165 |
| 4,029,048 A | * | 6/1977 | Gershbein ................... | 119/165 |
| 4,148,277 A | | 4/1979 | Engle et al. | |
| 4,224,899 A | | 9/1980 | Cruchelow et al. | |
| 4,844,016 A | | 7/1989 | Filosa | |
| 4,989,546 A | | 2/1991 | Cannaday | |
| 5,009,189 A | * | 4/1991 | Neff ............................ | 119/200 |
| 5,092,270 A | * | 3/1992 | Simons et al. .............. | 119/165 |
| 5,551,371 A | | 9/1996 | Markey et al. | |
| 5,727,502 A | | 3/1998 | Askins et al. | |
| 5,791,292 A | * | 8/1998 | Jempolsky .................. | 119/482 |
| 5,967,089 A | | 10/1999 | Allen | |
| 6,131,534 A | * | 10/2000 | Axelrod ...................... | 119/497 |
| 6,216,638 B1 | * | 4/2001 | Pivonka et al. ............. | 119/496 |

\* cited by examiner

*Primary Examiner*—Charles T. Jordan
*Assistant Examiner*—Judith A. Nelson
(74) *Attorney, Agent, or Firm*—Polster, Lieder, Woodruff & Lucchesi

(57) ABSTRACT

An animal enclosure of the present invention includes a pen sized to hold the animal. The pen is formed from a frame which is covered with a removable, washable cover. A gate for the enclosure includes a panel which is raised to close the gate and lowered to open the gate. The panel can be fixed at a desired position, so that the gate can be left partially opened. A top is provided which can be easily mounted to, and removed from, the pen frame. The top is hingedly connected to the frame and includes a pair of pivotal support arms so that the front of the top can be elevated above the pen a desired amount. A whelping rail is removably received in the pen. The whelping rail comprises a frame having a bar member and legs which support the bar above a bottom of the pen and inwardly from the pen walls.

31 Claims, 14 Drawing Sheets

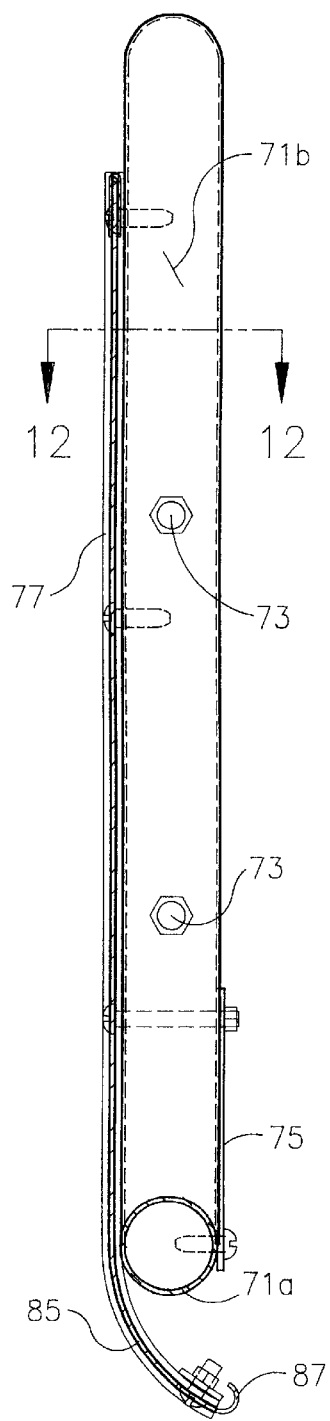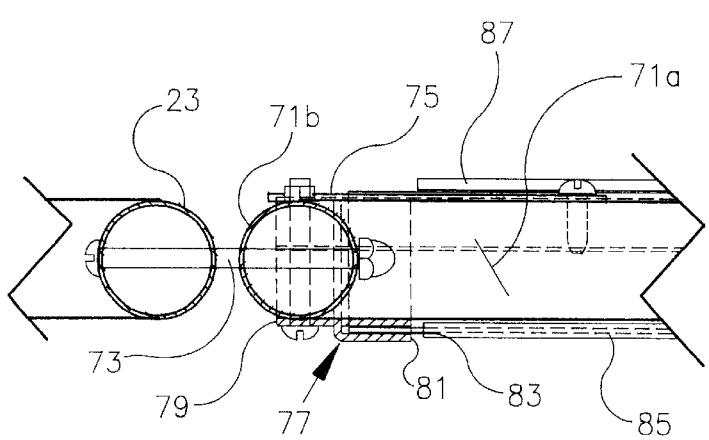
FIG. 11
FIG. 12

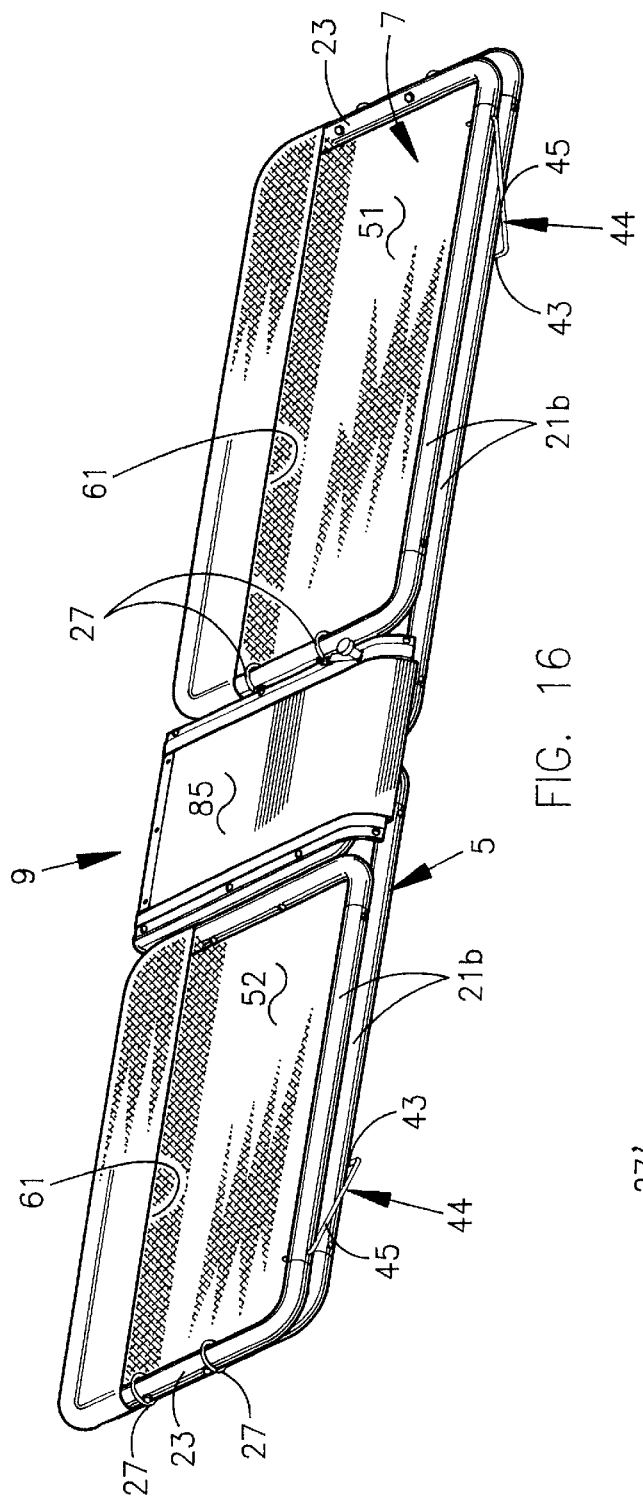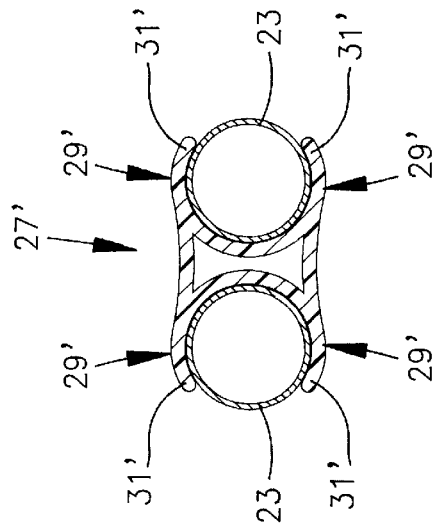

MULTI-USE PET ENVIRONMENT

CROSS-REFERENCE TO RELATED APPLICATIONS

Not Applicable

STATEMENT REGARDING FEDERALLY SPONSORED RESEARCH OR DEVELOPMENT

Not Applicable.

BACKGROUND OF THE INVENTION

This invention relates to pet enclosures and environments, and, in particular, to a pet environment that can serve multiple functions.

Enclosures and environments for dogs and other animals have long been used. Typical enclosures and environments include beds, cages, boxes, or fences, in which dogs may sleep, socialize with other animals, retreat from family activity, or be contained, for example, overnight, or when the owner is out of the house. However, such enclosures, although adequate for their intended purposes, still have drawbacks.

For example, a simple corrugated or wooden box may be used to contain a new puppy within the home. However, the box may readily become soiled and begin to emit offensive odors until the puppy becomes fully housebroken and/or the box is disposed of. If the puppy is teething, it will likely chew on, and damage or destroy, the box.

Furthermore, unless the box allows the puppy to readily see human and animal activity outside of the box, the box will inhibit the socialization process that is important to the development of a good family pet.

A metal cage somewhat reduces the problems associated with toileting, socialization, and teething, but it inhibits quick and easy access to the puppy for housebreaking and nurturing by both the mother dog and its human owners. It is also generally the most expensive type of pet environment.

A metal cage, along with corrugated and wooden boxes, is also not very compatible with typical home interior decor.

Boxes may inhibit a mother dog's view of, and access to, her puppies. If a mother dog should feel that her puppies need her, or she wants to feed (i.e., nurse) them, the mother dog may not have a sufficient view of the puppies to know where they are in the box, and can inadvertently injure them when she steps (or jumps) into the box to be with the puppies.

When a mother dog nurses her puppies, she most often lays down with her back against the wall of the whelping box. Sometimes, a puppy can be behind the mother, and the mother will lean against the puppy, possibly resulting in the suffocation of that puppy. In a standard wooden whelping box, a small wooden rail is often mounted to the inner surface of the walls. The rail assures that there is a space between the mother's body and the wall of the box. It also discourages the mother from leaning against the wall, since doing so would be uncomfortable. Thus, a clear breathing space for puppies will always be available between the mother's body and the wall of the whelping box to reduce the possibility of a puppy being caught between the mother dog and the wall of the whelping box. However, these rails are permanent and the box is primarily used for the single purpose of whelping.

Currently, there are many enclosures and environments that are available for pets. However, the respective enclosures are single use enclosures and environments; they serve only as a bed, for containment, a whelping box, or a personal space, for example. We know of no pet enclosures which are capable of serving all these functions at various times. Additionally, many of the currently existing pet enclosures are not easily cleaned; are not easily transportable; and often, do not complement the decor of the room or house in which they are placed.

BRIEF SUMMARY OF THE INVENTION

Briefly stated, an animal enclosure is provided which can be used for a plurality of purposes. The animal enclosure first of all includes a pen sized to hold the animal (i.e., dog). The pen comprises two side walls, a rear wall, a front wall, and a gate. The gate can be made of a single movable panel, or a plurality of removable panel slats or frames. In the first instance, the single panel is vertically movable in a channel between a raised position in which the gate is closed and a lowered position in which the gate is opened. A fastener is provided to secure the gate panel in a desired location. In the second instance, the gateway includes a channel which receives the panel slats. The slats are added, one on top of the other, until a desired height is reached. The slats can be solid or formed from wire (and opened). Whether the gate is made from a single panel or a plurality of slats, the gate panel can be provided with a top edge guard extending across at least a majority of the top of the panel to provide a smooth, unchewable surface across the top of the gate.

The enclosure walls are formed by framing (i.e., tubing) and the individual walls are hingedly connected together, such that the frame can be moved between a folded and an opened position. A corner lock is provided to maintain the enclosure in the opened position. The hinges can comprise eye bolts having a head which receives a vertical member of one wall and a shaft which extends through the vertical member of an adjacent wall. Alternatively, the hinges can comprise extruded lengths defining a pair of connected cylinders open along the length of the walls of the cylinders to snappingly receive the tubing of the frame. The corner lock comprises a corner brace which extends between adjacent walls, and is removable from at least one of the walls to which it is attachable to allow for folding of the enclosure.

A removable, washable pen cover is provided to cover the frame of the pen. The pen cover includes downwardly facing pockets along upper edges thereof which are sized to fit over the frame members. The pen cover has, for example, ties, snaps, or Velcro® fasteners, at the bottom of the cover walls to secure the cover to the frame bottom member.

An optional top is provided for the pen to give the pen a den-like feeling. The top is removably mountable to the pen. The top is made from a frame having a back edge, a front edge, and side edges. The frame is covered with a removable, washable top cover. The top is hingedly connected to the enclosure at the top back edge using a pair of spaced apart eye bolts as hinges. The eyebolt shafts are received in holes in the pen frame. The eyebolt shafts are not fastened to the pen frame so that the top can be removed very quickly if necessary. Alternatively, the top can be snappingly connected to the frame using the extrusion noted above. A pair of pivotal support arms are spaced rearwardly of the front edge of the top and have free ends which engage the top of the pen to support the front of the top above the pen frame. Preferably, the pen is provided with a plurality of openings into which the top support arms extend to enable the top to be positioned at a desired degree. The top is also provided with side flaps which hang from the top to a point below the top edge of the pen side walls. Because the top is hinged at its back, and elevated at its front, it forms a type of lean-to.

The enclosure can also be provided with a whelping rail which is removably received in the pen. The whelping rail comprises a frame having a bar member and legs extending diagonally downwardly and outwardly from the bar. The legs support the bar above a bottom of the pen and inwardly from the pen walls.

BRIEF DESCRIPTION OF THE SEVERAL VIEWS OF THE DRAWINGS

FIG. 11 is a cross-sectional view of the gate assembly taken along line 11—11 of FIG. 10;

FIG. 12 is a horizontal fragmentary cross-sectional view of the gate assembly taken along line 12—12 of FIG. 11;

FIG. 16 is a perspective view of the pen of the enclosure in a folded state; and FIG. 17 is a cross-sectional view of an alternative hinge mechanism for joining together frame members of the pen.

Corresponding reference numerals will be used throughout the several figures of the drawings.

DETAILED DESCRIPTION OF THE INVENTION

The following detailed description illustrates the invention by way of example and not by way of limitation. This description will clearly enable one skilled in the art to make and use the invention, and describes what we presently believe is the best mode of carrying out the invention.

Figure 1:
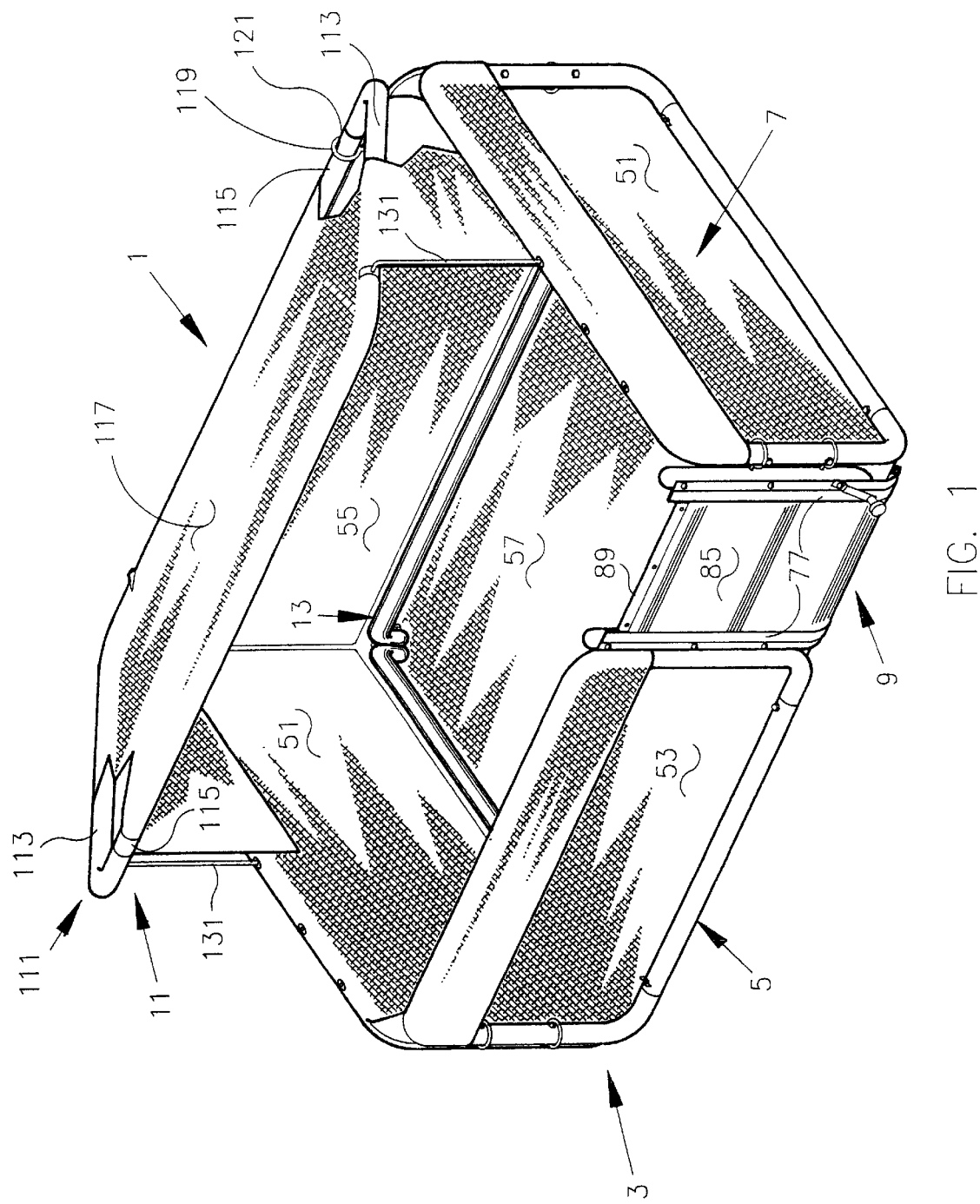
FIG. 1 is a perspective view of a dog enclosure of the present invention, showing the pen with its associated removable top and removable whelping rail.
Figure 7:
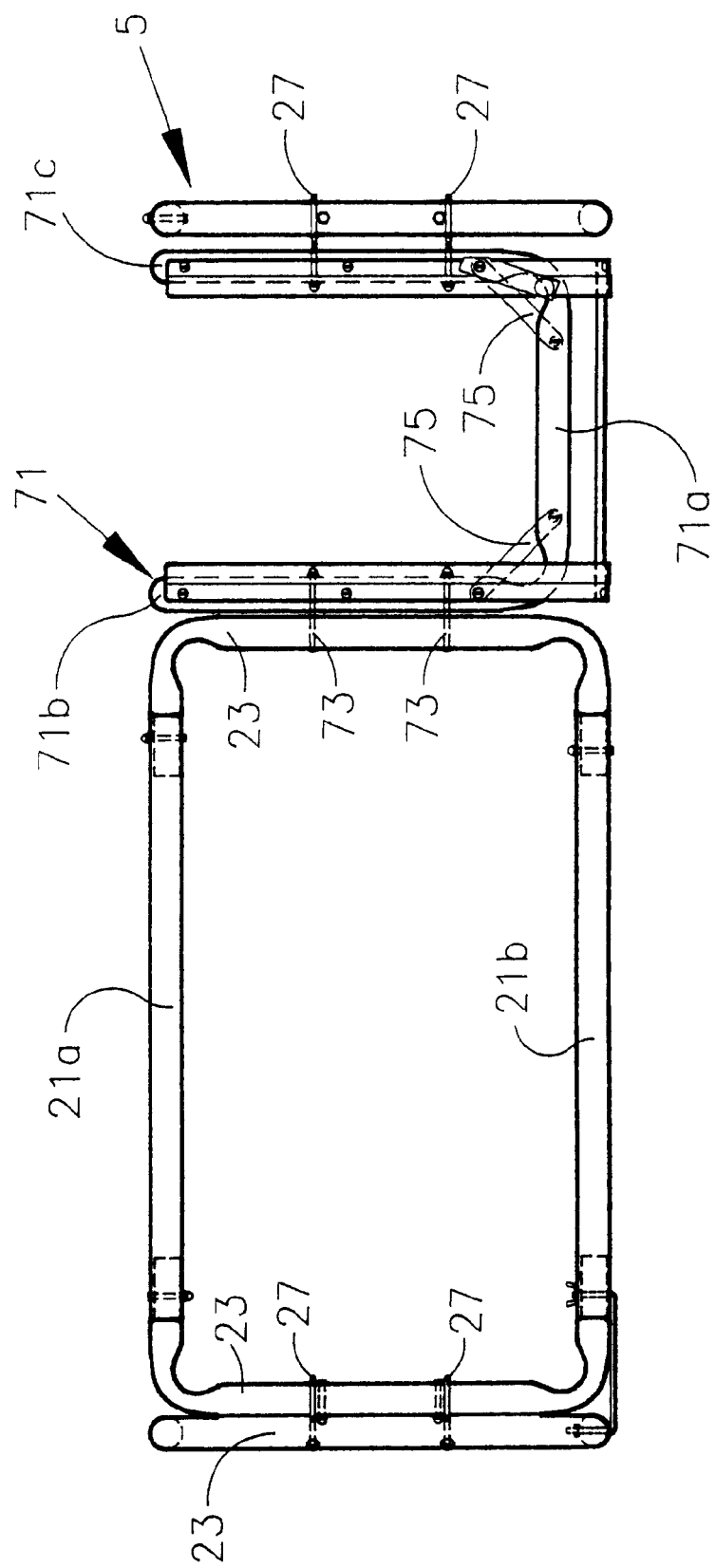
FIG. 7 is a front elevational view of a frame for the pen.
Figure 15:
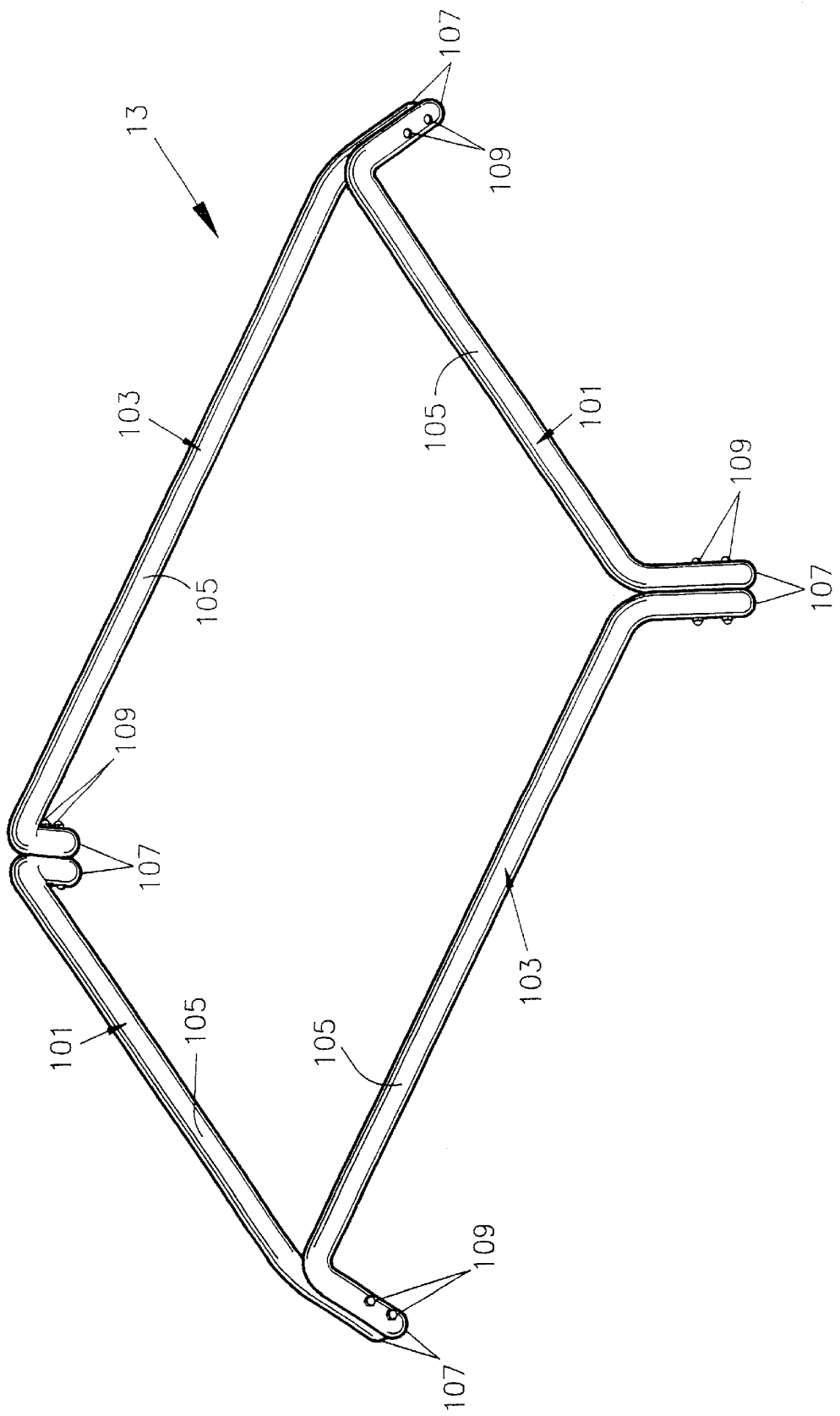
FIG. 15 is a perspective view of a removable whelping rail accessory for the pen.

A pet enclosure 1 of the present invention is shown generally in FIG. 1. Although described for use with a dog, the pet enclosure can also be used with cats and other pets. The enclosures 1 includes a pen 3 made from a tubular frame 5 (FIG. 7). A washable soft cover 7 covers the frame 5 and can easily be removed for cleaning. The cover 7 is preferably a cloth cover. The removability of the cover 7 also allows for the cover to be easily changed, for example, between washings or to change the color or pattern of the cover. Hence the cover can be changed to match the decor of the room in which the pen is; placed. The pen 3 includes a gate 9 which can be moved between a raised position and a lowered position. In the lowered position, the dog can easily enter and exit the pen 3. When the gate is raised, dogs (and especially puppies) are prevented from exiting the pen 3. As will be described below, the gate 9 can be raised or lowered to be at a desired height. That is, the gate can be placed in a fully raised position, a fully lowered position or at a desired position between the fully raised and fully lowered positions. Thus, the gate can be lowered to a desired height which will prevent puppies from exiting the pen, but will allow a mother dog to enter and exit the pen. It is anticipated that the gate will generally be kept in a position, which will allow the mother to freely enter and exit the pen, and yet still contain the puppies in the pen. The adjustability of the gate allows the gate to be raised as the puppies grow to contain the puppies in the pen, yet still allow the mother dog to readily see and gain access to her puppies. The pen 3 is preferably a low-profile pen, having a height approximately equal to the shoulder height of an adult dog of various breeds. To avoid the need to make numerous different sizes of pens, the pen is provided in small, medium, and large sizes. The pet enclosure 1 can optionally be provided with a cover or top 11 and a whelping rail 13 (FIG. 15).

The features of the soft wall, gated pen with the optional cover and whelping rail allow the pet enclosure to be used throughout the several stages of a pet's life. Thus, by adding (or removing) the top rail 11 and whelping rail 13, the pen can be adapted for use not only when the dog is a puppy and full grown dog, but can be used as a birthing place for pregnant females, as well as a place where the mother dog can safely nurse, clean and nurture her puppies.

When dogs are puppies, the puppies can be placed in the pen to keep them from getting underfoot and possibly injured when there is human activity, and especially when children are around. When the gate is raised, the puppies will not be able to exit the pen. The height of the gate can be varied for the breed of the dog contained in the pen, and can be varied as the puppies grow larger. Thus, the gate can be adjusted to a height that safely contains the puppies, yet permits them to see outside the pen as the puppies grow. Thus, the puppies can enjoy the mental stimulation of seeing human activity going on about them, thereby helping in the socialization process. Additionally, the moderate height of the walls of the pen permit humans to readily interact with puppies while they are in the pen, again, helping with the puppies' socialization process.

The pen can also serve as a place where the puppies' chewing toys are kept. When the puppies are still young and confined to the pen, the pen will prevent the puppies from chewing on furniture and other household items. However, once the puppies are older and begin to be allowed out of the pen, with the chewing toys readily accessible to the puppies, they have already begun to be conditioned to accept chewing on the toys, rather than on household items, such as rugs and furniture, for example.

As a contained environment, the pen can be provided with a disposable floor surface or liner during the house breaking process to protect the cover 7 from being soiled. Should a puppy soil the disposable floor surface, it can be quickly and easily removed and thrown away. The disposable floor surface or liner can be as simple as newspapers that are placed on the pen floor. Alternatively, a replaceable liner can be used which has a fluid impervious bottom surface, which is placed against the pen floor, and an absorptive upper surface. Such a liner would protect the pen floor. As another alternative, a removable floor liner can be placed in the bottom of the pen 3. The use of the disposable and/or replaceable liners will protect the cover 7 so that the cover 7 will not have to be washed as often during the housebreaking process. If the cover 7 itself does becomes soiled, it can be removed and replaced with a clean cover 7 while the soiled cover is being washed.

Once a puppy has matured, the pen 3 can be fitted with a dog bed, transforming the pen into the dog's own personal environment within the home. The dog bed can be any commercially available dog bed that will fit in the pen 3. The pen thus becomes a place where the dog can retire to sleep or to retreat from human activity. Additionally, the dog's toys can be kept in the pen, and the dog will know that it can get its toys from the pen when desired. Because the pen is easily folded, and transportable the pen 3 can be moved about the house or taken outdoors. Additionally, the pen can be taken along on family vacations, and set up in a hotel room, vacation home, etc., giving the pet the comfort of a familiar place when taken on vacation.

For pregnant female dogs, having a known and secure environment is particularly important. As the birthing time approaches, the mother dog may spend more and more time in the pen in anticipation of the birth. Additionally, pregnant dogs tend to prefer darker more confined environments (i.e., den-like environments) when giving birth. To accommodate this, the accessory top cover 11 can be placed on the pen. The top or cover 11 can easily be applied to the pen 3 and set to any one of several desired positions, all of which permit visual access to the pregnant dog by her owners. As discussed below, the cover 11 can be quickly and easily removed from the pen 3 should it be determined that either the birthing mother or one of her puppies is in distress and intervention is needed.

In anticipation of the birth, the pen 3 can be lined with clean paper, or other disposable linings. The pen can also be fitted with the whelping rail 13. The rail 13 effectively prevents accidental smothering of a newborn puppy that may become trapped between its mother's body and the wall of the pen. Because the pen is soft-sided, the possibility of this occurring is further reduced.

Once the puppies are born, the pen provides a safe environment for the puppies. The gate can be positioned to allow for easy entry and exit for the mother, while preventing the puppies from exiting the pen. The gate is preferably lowered to a height that will allow the mother dog to step over the gate without scratching her sensitive underside, and yet sufficiently high to prevent the puppies from exiting the pen. However, the top edge of the gate is smooth, to reduce the possibility of abrading the new mothers sensitive underside as she crosses over the gate. Additionally, the top edge of the gate is made of a hard material that substantially precludes damage to the gate when the puppies chew on it. Further, the walls of the pen 3 are sized such that the mother can look into the pen from outside the pen and see her puppies.

In a preferred embodiment, the frame 5 (FIGS. 7 and 8) is preferably a tubular frame made from a series of top and bottom horizontal members 21*a,b* and vertical side members 23. The frame members are preferably metal tubes, but could be made from extruded or molded plastic tubes. The members 21*a,b* and 23 are assembled together to form four walls: two side walls, a back wall, and a front wall. A gap is formed in the front wall to accept the gate assembly 9. The horizontal members 21*a,b* are preferably straight hollow tubes. The vertical members, on the other hand, have a vertical portion 23*a* and top and bottom horizontal portions 23*b*. The vertical members are unitary, one-piece tubular members, and are bent to transition between their vertical and horizontal portions. The tubes of the vertical members are swaged (or otherwise reduced in diameter) at the ends of the top and bottom horizontal portion to define noses 25 which are frictionally received in the respective ends of the horizontal members. This construction of the frame members lends itself to allow for a small size in shipping and storing of the pens, and more readily accommodates desired changes to the length and width of the pen. To hold the frame members together, bolts 26 extend through the horizontal frame members 21*a* and the nose section 25 of the vertical frame members 23. Nuts 28 are provided to hold the bolts 26 in place. If desired, pins, bolts, ball and detent, or other conventional means can be used to secure the vertical and horizontal members together to form the walls of the frame 7.

Figure 8:
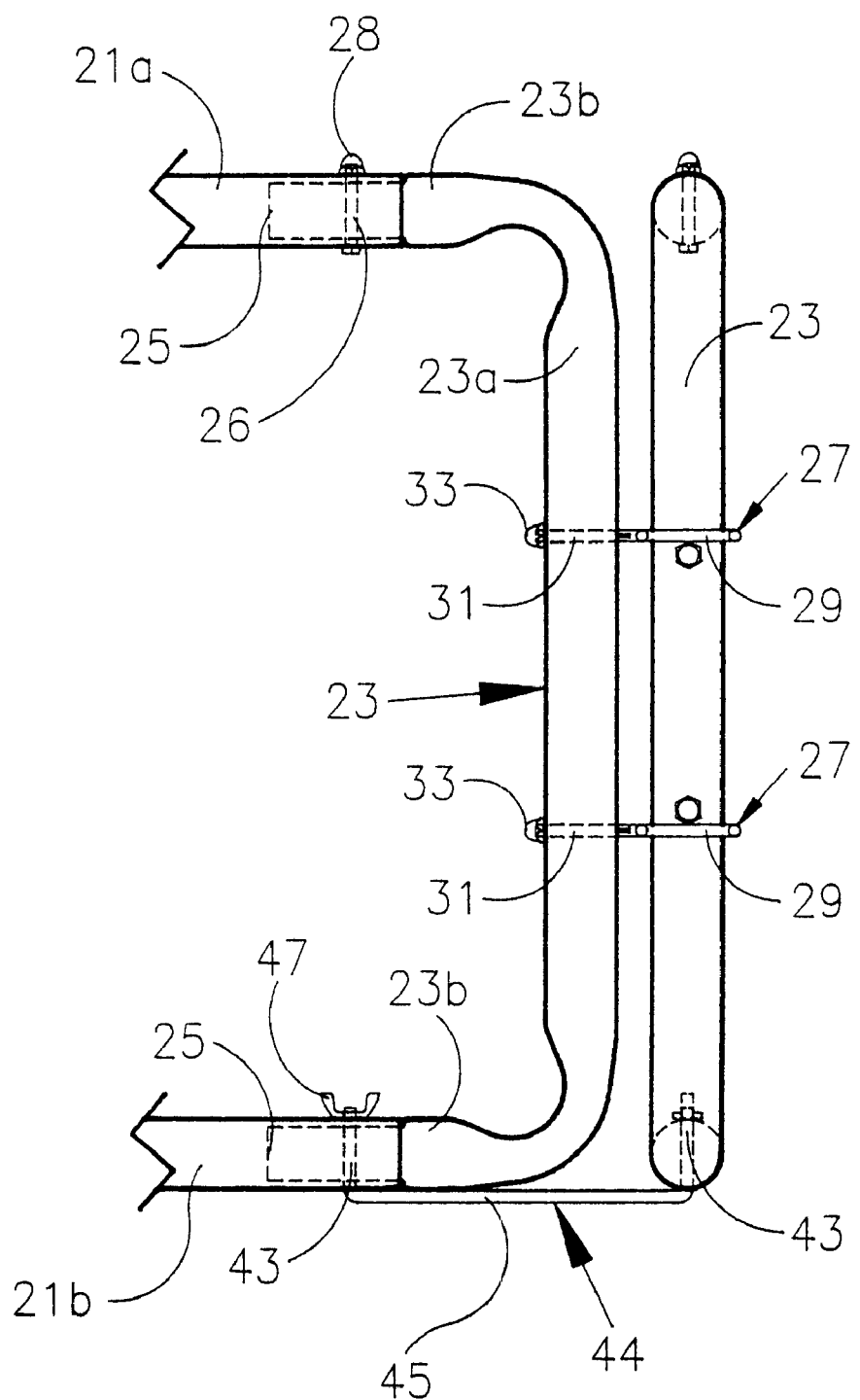
FIG. 8 is an enlarged fragmentary view showing the connection of two walls of the frame.

The connection of the frame walls (i.e., the side walls to the front and back walls) is accomplished using eyebolts 27 and corner braces 44, as seen in FIGS. 7 and 8. The eyebolts 27 each have a circular head 29 through which the vertical member 23 of one wall extends, and a shaft 31 which extends through an opening in the neighboring vertical member. The end of the shaft 31 is preferably threaded, and a lock nut 33 is applied to the end of the shaft to prevent the shaft from exiting the member through which it extends. Preferably, two eyebolts 27 are used at each corner of the pen, in a vertically spaced apart relationship. As can be appreciated, the eyebolts act as hinges, and allow the walls of the pen 3 to pivot about the corners of the pen. Thus, the pen can be moved between a opened position, as shown in FIGS. 1–6, and a folded position, as seen in FIG. 16. Because the frame 5 is made from lightweight tubing, the frame is light, and when folded, is quite compact. Thus, the folded frame, with its fabric cover, can be easily moved from one location to another. For example, the frame, with its fabric cover, can be moved from one room to another within a house, or, when a family goes on vacation, the frame can be folded and set up easily and quickly in a hotel room or vacation home. A carrier or tube can be provided to contain the folded pen.

Although eyebolts are shown to connect the frame walls together, the frame elements can be connected with, for example, plastic extrusions 27' (FIG. 17), which snappingly receive the vertical frame members 23. Such an extrusion would have two identical portions 29' with curved fingers 31' which define cylinders with an elongate slot into which the tubing 23 is snappingly received. The backs of the two portions 29' would then be directly connected together, or connected by a web. The size of the finger would allow for the frame members to pivot in the connector, to allow for folding of the frame.

Corner braces 44 prevent the pen 3 from inadvertently being folded when in use and in the open position. The corner braces 44 comprise generally U-shaped bolts having two end shafts 43 which are connected by a connecting section 45. The connecting section 45 extends diagonally underneath the frame 5 and the end shafts extend up through the noses 25 of the frame vertical members 23. Thus, the corner braces 44 also help in maintaining the frame members together. The ends of the shafts 43 are threaded, and nuts 47 (for example wing nuts) are threaded on to the ends of the shafts 43 to hold the corner brace in place. The corner braces 44 rigidize the frame, and hence, must be removed for the frame to be folded. Although U-bolts are shown for the corner braces, the U-bolts can be replaced with any conventional corner locking device. For example, a pivoting arm can be fixed to the side walls near the front and backs of the side walls. The arm can be provided with a key-hole or bayonet-slot type opening which is received over a headed stud on the front and back walls. The use of a pivoting arm would eliminate the necessity of totally removing the corner brace to fold the pen. Rather, the corner brace would merely need to be unlocked.

Figure 9:
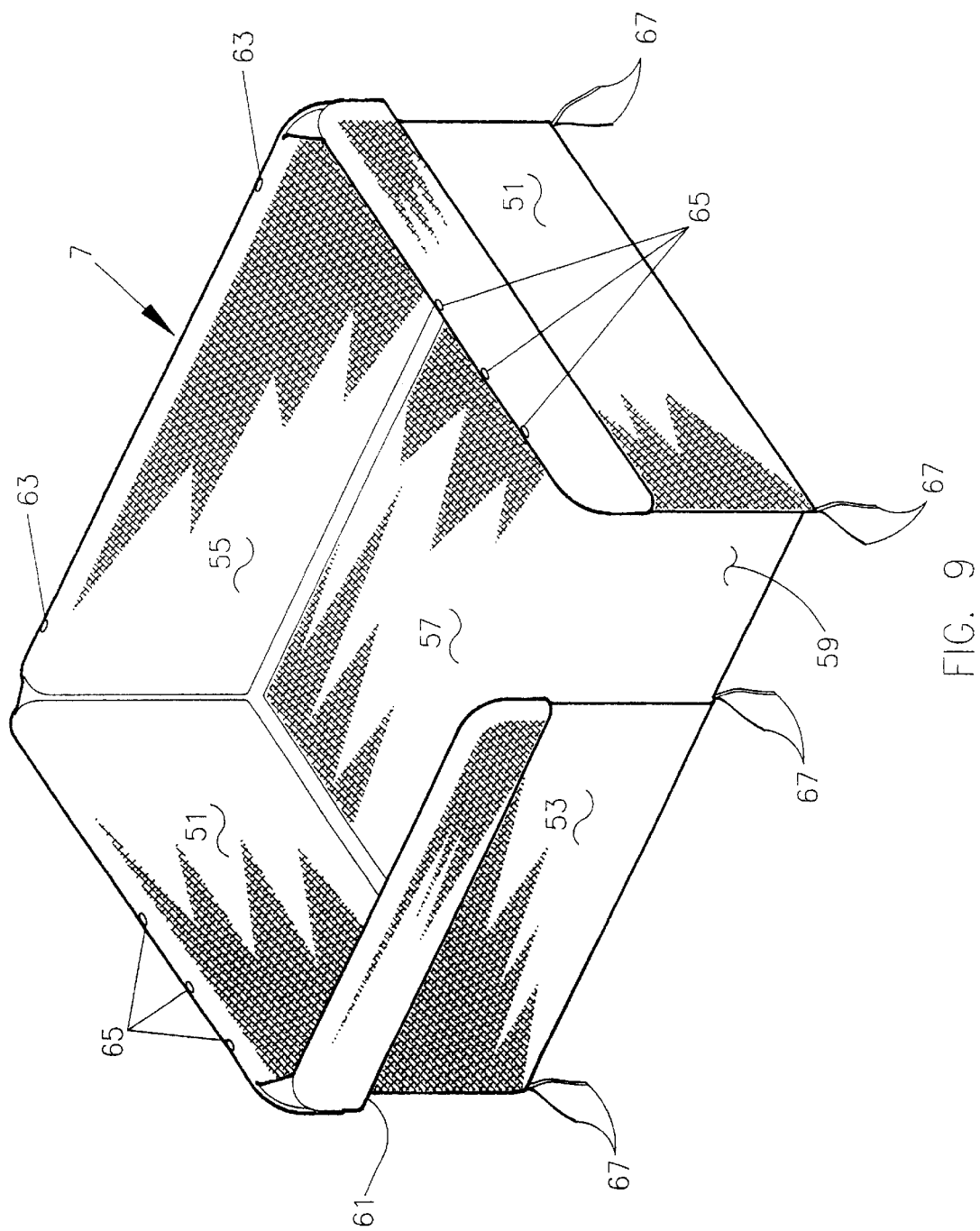
FIG. 9 is a perspective view of a cloth cover which covers the frame.
Figure 10:
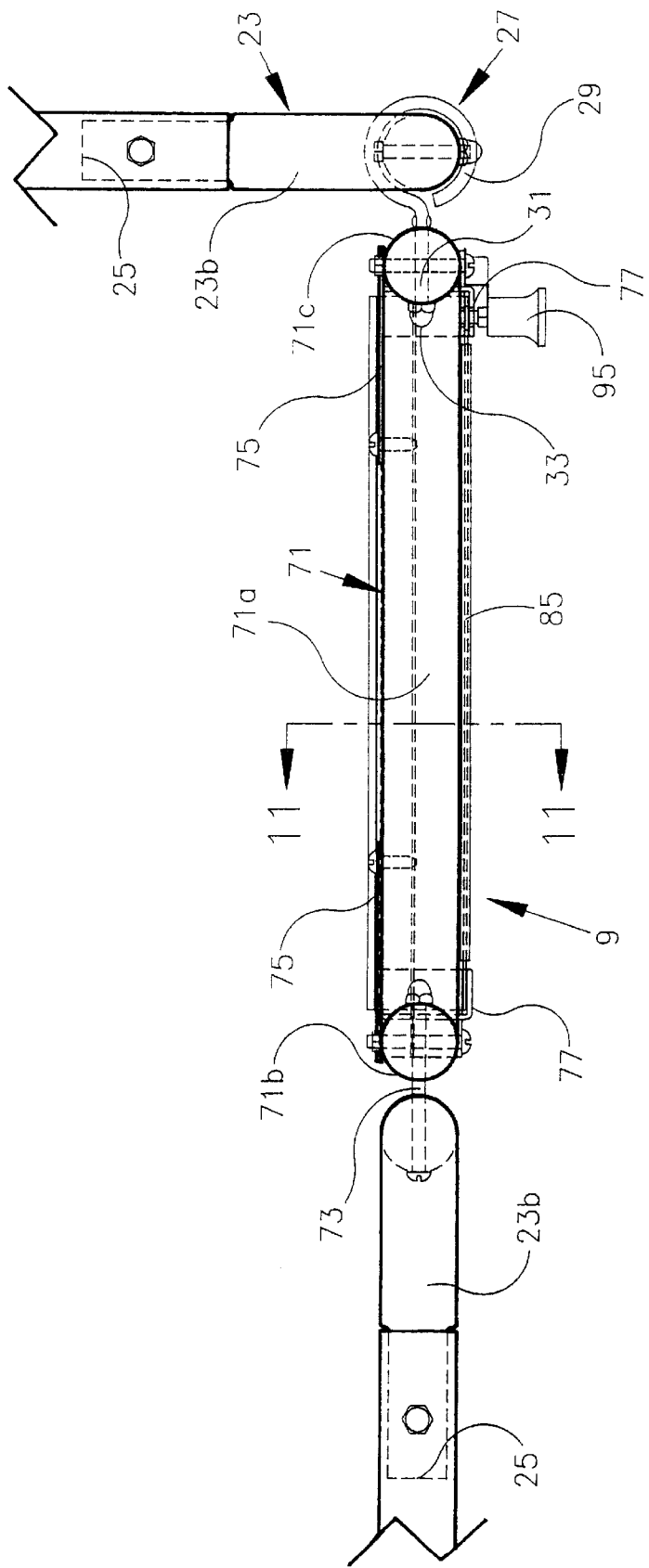
FIG. 10 is a fragmentary top plan view of the frame showing the gate assembly for the pen using a flexible single panel for the gate.

The washable, flexible, removable frame cover 7 is shown in FIG. 9. The cover 7 includes opposed side walls 51, a front wall 53, a back wall 55, and a bottom 57. The front wall 53 includes a gap or opening 59 for the gate. The walls of the cover 7 extend down the inside of the frame from the top of the frame to the bottom of the frame. Pockets 61 are formed at the tops of the walls and are sized to fit over the frame top members. Holes 63 are formed in the top of the back wall pocket and holes 65 are formed in the top of the side wall pockets. The hole 63 and holes 65 allow for mounting of the top/cover 11 on the frame 3, as discussed below. Fasteners, such as ties 67 are provided at the corners and at the edge of the gate opening 57 near the bottom of the cover to hold the cover in place on the frame 5. Because the cover 9 is held in place on the pen frame 3 by the cover pockets 61 and ties 67, the cover can be easily removed from the pen frame for washing or replacing. Although the fasteners are shown to be ties, bands with snaps, buttons, hook-and-loop fasteners, or other types of commonly available fasteners can be used to removably hold the cover 11 to the frame 3.

The gate assembly 9 is shown in FIGS. 7 and 10–12. As noted above, because the gate can be lowered or raised a desired amount, to, for example, allow a mother dog to enter and exit the pen, but prevent puppies from exiting the pen, the gate assembly is one of the important features of the pen 3. The gate assembly 9 includes a gate frame 71 made from a U-shaped tubular member. The frame 71 has a bottom portion 71a and vertical side portions 71b,c. As seen in FIG. 7, the frame bottom portion 71a is raised relative to the bottom members 21b of the pen frame 5. The gate frame 71 is secured to the pen frame vertical members 23 by bolts 73 which extend through the gate frame side 71b and the neighboring pen frame member 23. Eyebolts 27 are used to hingedly connect the opposite gate frame side 71c to the neighboring corner vertical member 23. As can be appreciated, the gate assembly 9 completes the front wall of the frame. The bolts 73 provide for an essentially rigid connection between the gate assembly and the inner end of the front wall; and the eyebolts 27 provide for a hinged connection between the gate and a corner vertical member of the pen frame.

Braces 75 extend diagonally between the gate frame bottom 71a and the gate frame sides 71b,c. The braces 75 are sized and positioned so that they will not interfere with the pet's use of the gate. Yet, the size of the braces 75 will strengthen the crush bend that is formed in the tubing which forms the gate frame 71, and could be dispensed with if the gate was formed in a different manner. For example, separate elbow joints could be used to form the corners of the gate frame 71.

Figure 6:
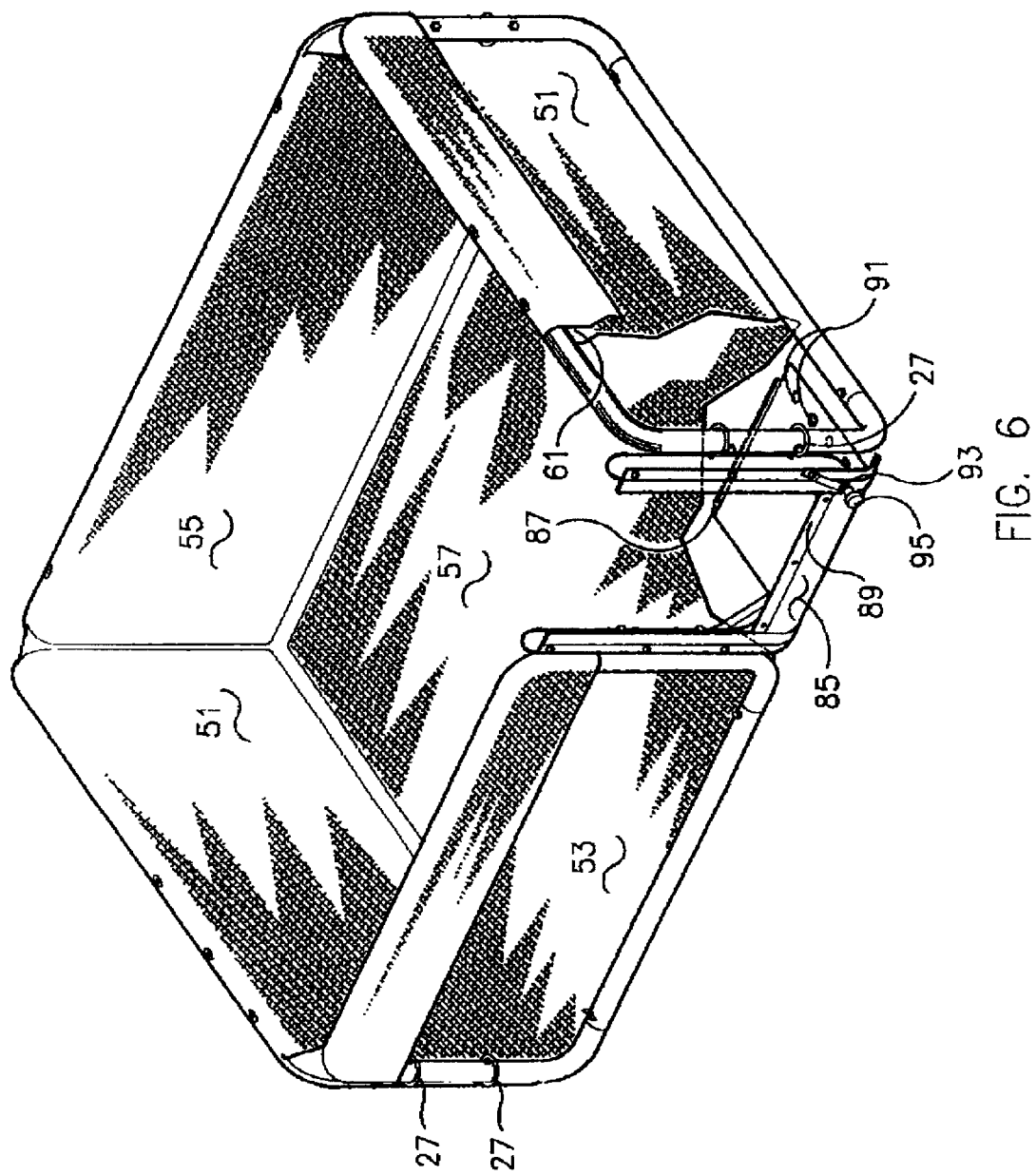
FIG. 6 is a view similar to FIG. 5, but showing the gate completely lowered and with the floor of the covering partially cut away to show the operation of the gate.

A pair of opposed track members 77 are mounted to the sides 71b,c of the gate frame. The track members 77 include a flange 79 through which bolts extend to secure the members 77 to the gate frame and a pair of spaced apart rails 81 defining a channel 83. The track 77 extends from a point just below the top of the frame sides to a point below the gate frame bottom portion 71a and bends inwardly (to be under the bottom of the cover 7). A pliable panel 85 is slidably received in the track 77. The panel 85 is preferably made of flexible plastic, or some other flexible material which can be easily washed. The panel 85 is turned up at its bottom to form a curved portion or end 87 to facilitate movement of the panel across a textured surface (such as carpet, cement, grass, etc.) when the panel 85 is lowered. Hence, the curved end 87 of the panel 85 helps in causing the panel to bend inwardly, to be under the cover bottom 57 as seen in FIG. 6. The curved end 87 of the panel 85 prevents the bottom edge of the panel from catching on the textured surface so that the panel 85 will slide along textured surfaces (such as rug, cement, etc) as easily as it will slide along a smooth surface (such as wood, linoleum, etc.). The curved end 87 of the panel also helps rigidize the end of the panel 85. As seen in FIG. 11, the curved end 87 generally forms a semi-circle (or an arc of about 180°). Inasmuch as the curved end 87 is provided to facilitate movement of the panel over textured surfaces, the curvature 87 of the curved end could be altered if desired. For example, it could form nearly a complete circle, or only a quarter-circle.

The curved end 87 of the panel 85 is preferably set inwardly of the edges of the panel so that the curved end 87 will not interfere with removal of the panel 85 from the gate (by pulling the panel 85 up through the track 77) so that the panel can be cleaned or replaced, if necessary. The curved end 87 could extend the full width of the panel 85. In this instance, the curved end would prevent the panel from being pulled up and out of the track 77. To remove the panel 85 from the track 77, the panel would be pulled out the bottom of the track.

Figure 5:
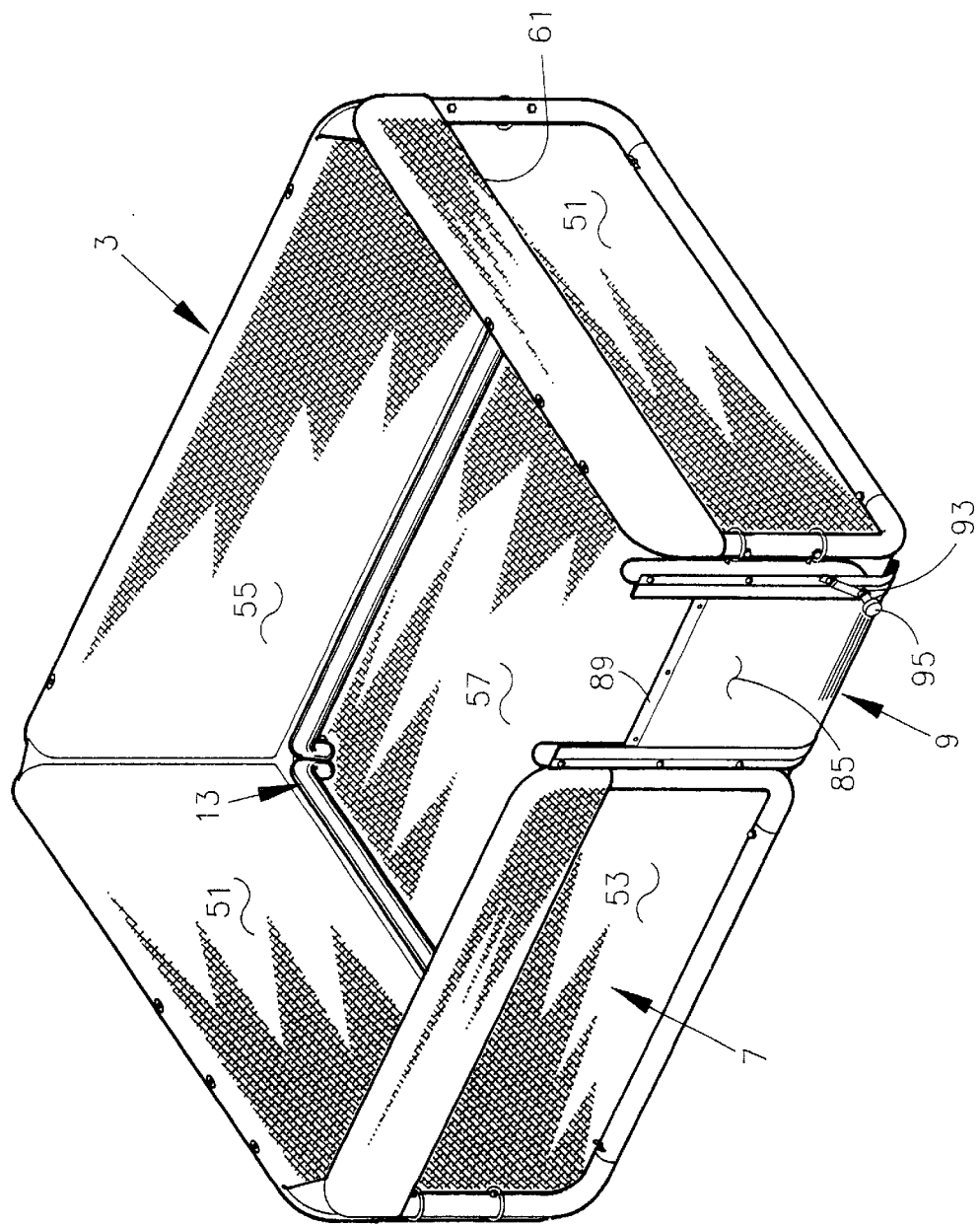
FIG. 5 is a perspective view of the pen of the dog enclosure, showing the gate in a partially lowered position to allow a mother dog to enter and exit the pen, yet prevent puppies from exiting the pen, and including a removable whelping rail.

The top edge of the panel 85 is capped with a top guard 89 (FIG. 5). The top guard 89 provides a smooth surface to the top edge of the panel 85 to help prevent abrading the teats of a nursing female (and the undersides of pets in general) when crossing through the gate. Additionally, the hard cap 89 prevents puppies (and other chewing pets) from damaging the top of the panel 85.

The panel 85 can be held in place frictionally. However, it includes a plurality of holes 91 along one edge thereof. The track 77 includes a hole 93 (FIG. 5) near the bottom thereof. A spring biased pin 95 (FIG. 6) is mounted to the track over the hole 91. The pin 95 extends through the track hole 93 to engage a selected hole 91 in the panel 85 to keep the panel 85 from sliding, for example, from a dog leaning on the panel 85.

Figure 13:
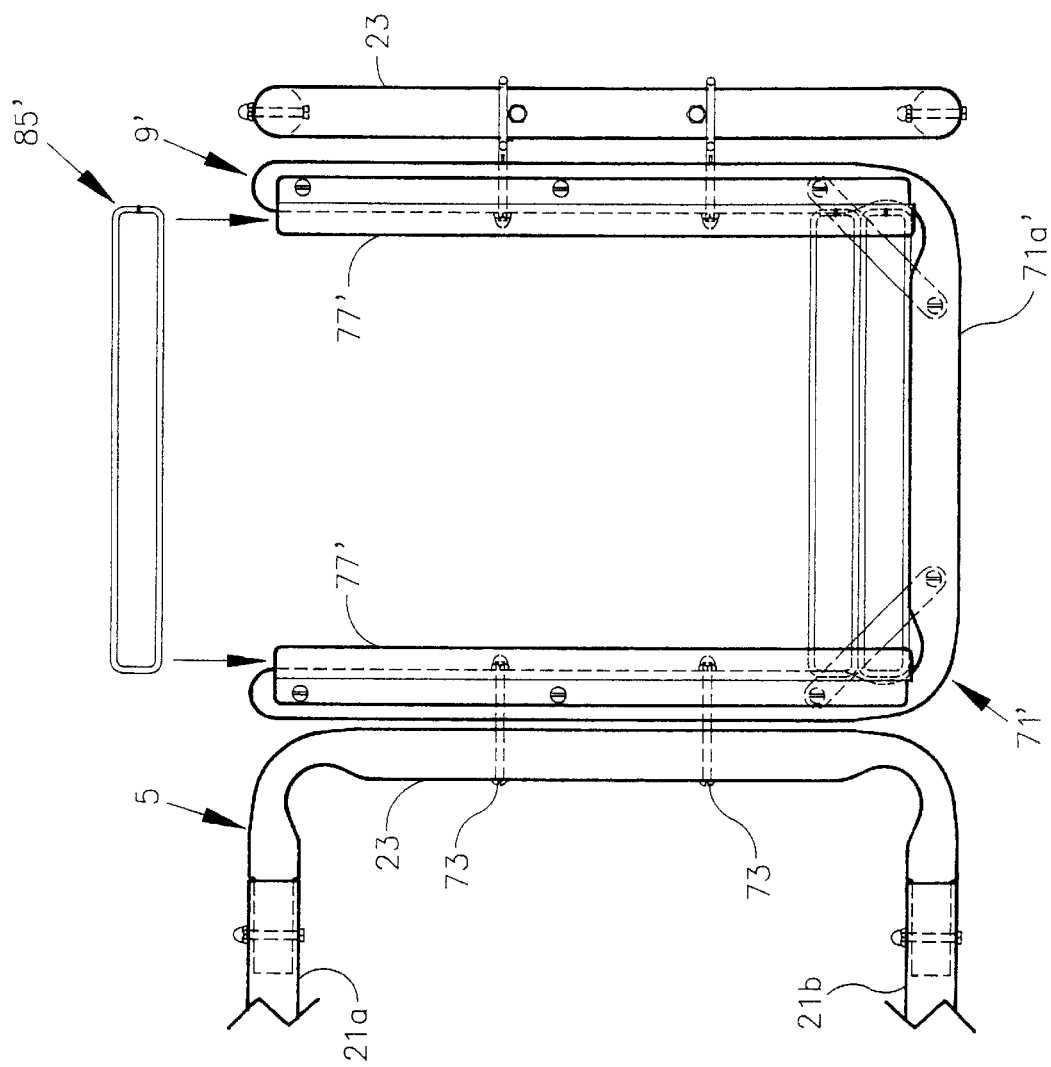
FIG. 13 is a front elevational view of the gate assembly using slats or frames, rather than a single panel, as the gate.

In an alternate embodiment, the gate 9' (FIG. 13) has a frame 71' which extends the full height of the pen frame 5. That is, the gate frame bottom member 71a' is level with the pen frame bottom members 21b. Rather than using a single panel 85, the gate 9' is provided with a plurality of slats 85'. Slats 85' are simply inserted in (or removed from) the tracks 77' until the gate 9' is raised (or lowered) to a desired position. The slats 85' shown in FIG. 13 are formed wire slats. No covering is provided to the slats 85'. They are sized so that a puppy can not pass through the slats. The advantage of formed wire slats is that they are light weight and easy to store. For example, a hook or loop can be provided on the side of the cover on which the formed wire slats can be hung. Additionally, the wire form slats form a smooth surface which will not abrade the underside of a dog or the teats of a nursing mother. Further, because they are made of wire, teething puppies will not be able to damage them.

Figure 14:
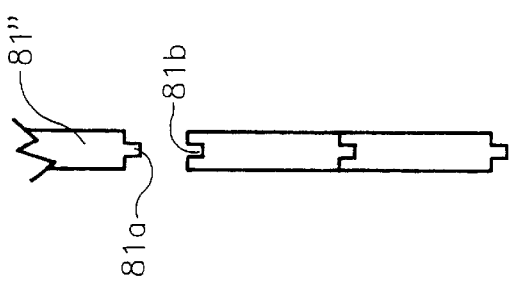
FIG. 14 is a partially exploded end view of an alternative slat for use with the gate of FIG. 13.

An alternative slat 81" is shown in FIG. 14. The slat 81" is a solid slat having a tongue 81*a* on its top and a groove 81*b* on its bottom. The slates 81" can be plastic, wood, or metal slats. If plastic, they can be formed as an extrusion and cut to length. Alternatively, they can be injection molded. Because the slats 81" are made of plastic, they are inherently softer than the wire slats 81'. Thus, a specific one of the slats will be a top slat and be provided with a metal cap to reduce the possibilities of abrasion and prevent teething puppies from damaging the top slat 81". If the slats are made from extruded aluminum, no cap is required.

As noted above, the whelping rail 13 (FIG. 15) can be inserted in the pen to further reduce the possibility of a puppy becoming lodged between the mother dog and the side of the pen 3. The whelping rail 13 comprises four tubes—two side tubes 101, and front and back tubes 103. Each of the tubes has a horizontal rail portion 105 and leg portions 107 at opposite ends of the rail portion. The tubes are joined together at the leg portions by bolts 109, for example, which extend through the legs 107 to form the whelping rail 13. The legs 107 extend from the rail portions 105 at an angle, such that when the whelping rail is formed, the bottom ends of the legs will be received substantially in the corners of the pen and the rails portions 105 will be above the pen bottom and spaced inwardly from the pen walls. The legs 107 are sized and angled such that the rail is about 4" above the pen bottom and about 3" from the walls of the pen. If the mother dog leans against the rail, there is a gap between the mother and the wall of the pen. Thus, if a pup is in this area, there will be a space to reduce the possibility of the mother dog suffocating her puppy.

Because the whelping rail only needs to be used for a short period of time, it is designed to be easily inserted into the pen, simply by dropping it in the pen. Once the puppies are weaned, and are no longer nursing, the whelping rail can be simply lifted out of the pen.

Turning to FIGS. 1–4, the top 11 includes a tubular frame 111 made from side tubes 113 and front and back tubes 115 which are assembled in substantially the same way as the wall portions of the pen frame 7. A fabric cover 117 is applied to the top frame 111. As can be appreciated, the top frame cover 117 is provided with channels along its front edges into which the tubes 113 extend. The rear channel 107 is formed by wrapping or folding the cover about itself, and using hook and loop type fasteners (i.e., Velcro®) to maintain the channels in the cover 117. Thus, the cover 117 can be easily removed from the top frame 111 for washing. Alternatively, snaps or a zipper, or any other easy-to-use fastener can be used which will allow for easy mounting and dismounting of the cover 117 from the frame 111.

The top 11 is hingedly mounted to the pen frame 5 using a pair of hinges 119. The hinges 119 are eye bolts having a head through which the top frame back tube extends and a shaft which extends into the pen frame top member 21*a*. The head 121 is sized so that the top back tube 105 can pivot in the head. The eye-bolt shafts extend through the openings 63 (FIG. 9) in the pen cover 11 and corresponding holes in the pen frame top tube 21*a*. Alternatively, sections of the extrusion 27' can be used to hingedly mount the top 11 to the frame 5. The use of the extrusion 27' would allow for snapping the top 11 onto the frame 5, while still allowing for pivoting of the top relative to the frame and for quick removability of the top from the frame.

Figure 3:
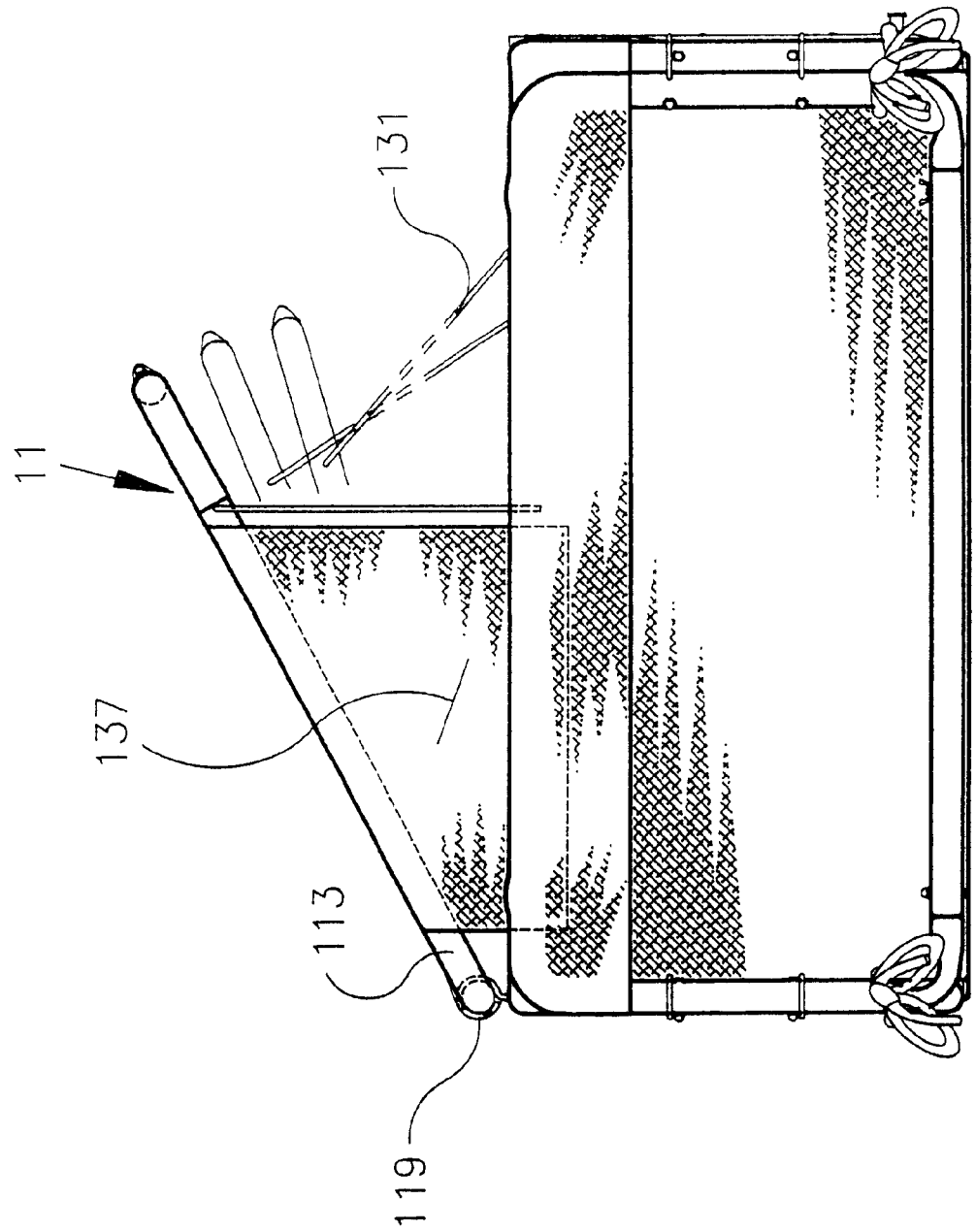
FIG. 3 is a side elevational view of the pen and top, the top being shown in two alternate (lower) positions in phantom.
Figure 4:
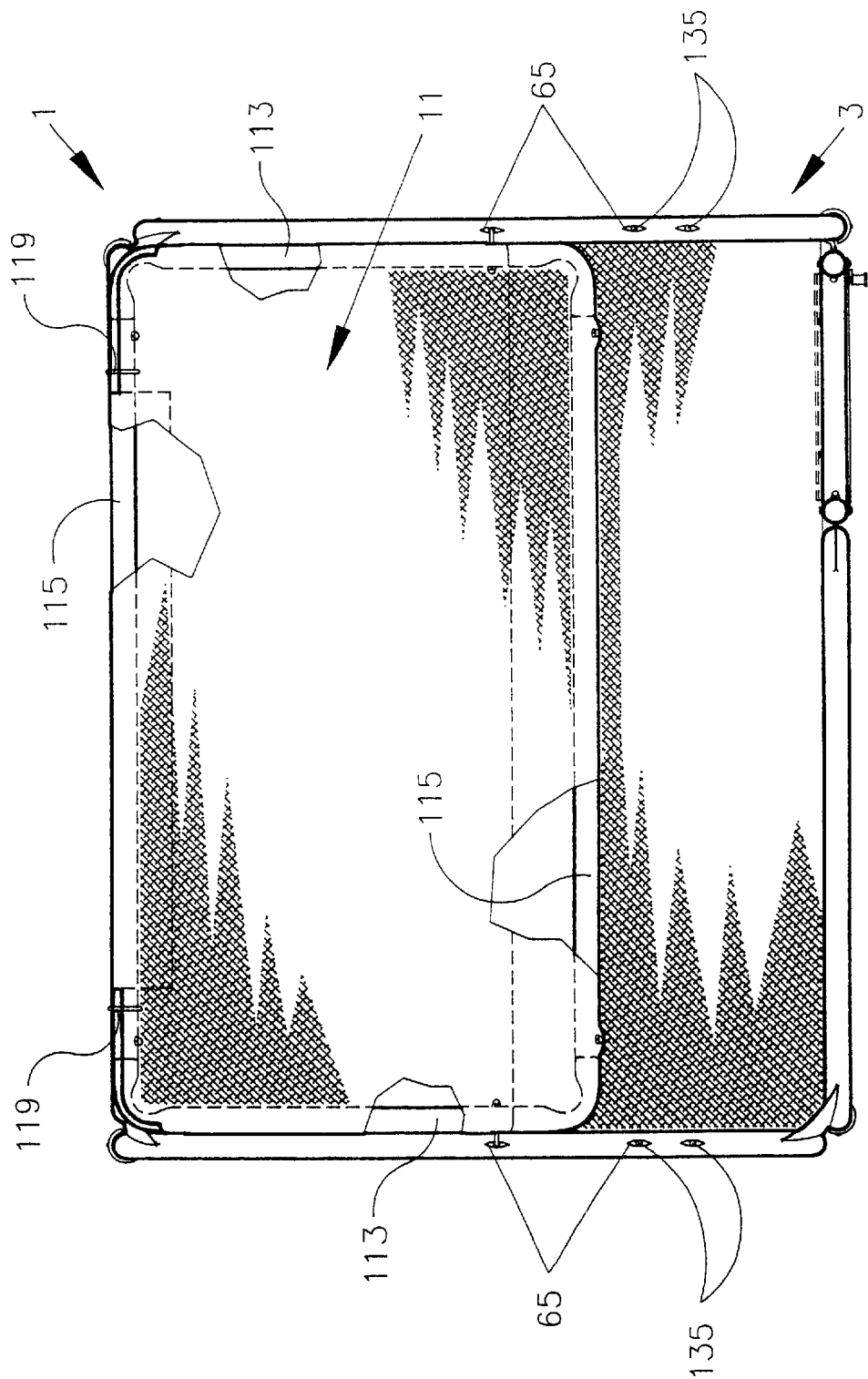
FIG. 4 is a top plan view of the pen and top.

The top also includes a pair of pivoting arms 131 which support the top 11 in a sloped position, as seen in FIG. 3. The arms 131 each include a top finger 133 which extends through the top frame side tubes at a point slightly rearwardly of the front of the top frame. The end of the fingers 133 are threaded, and accept a nut to secure the arm 131 to the top frame. The forward, free ends, of the arms 131 are received in holes 135 (FIG. 4) in the pen frame top side members. Preferably, there are several holes 135 in the pen frame top members (three holes are shown) so that the slope of the top 11 can be selectively altered. The cover holes 65 are aligned with the frame holes 135. As can be seen, preferably the pen cover holes 65 are larger than the frame holes 135. The pen cover holes 63 and 65 are preferably reinforced, to reduce the possibility of the pen cover 117 fraying at the holes. The pen cover holes 63 and 65 can be reinforced, for example with grommets, or by button-hole stitching.

Figure 2:
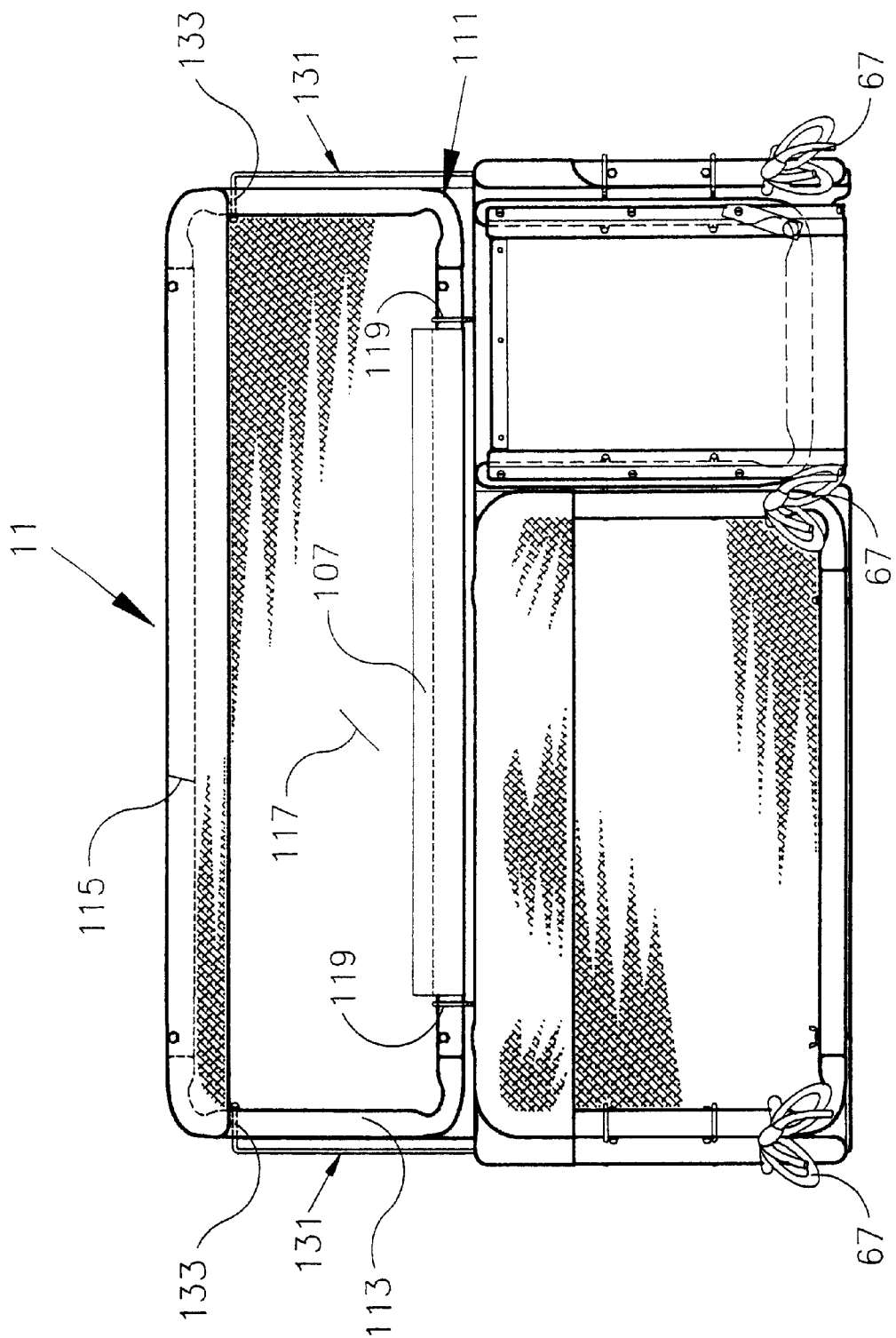
FIG. 2 is a front elevational view of the pen with the top.

Preferably, the frame top 11 has a side-to-side width that is slightly smaller than the side-to-side width of the pen 3, so that the arms 131 can be straight as seen in FIG. 2. Thus, as seen best in FIG. 4, the distance between the outer edges of the top frame side tubes is slightly less than the distance between the inner edges of the pen frame side walls. Additionally, the front-to-back depth of the top 11 is shorter than the front-to-back depth of the pen 3. The top 11 can also include side flaps 137 (FIG. 3) to enhance the den-like environment formed by the top 11. The flaps 137 are preferably trapezoidal in shape and are sized to hang from the top frame side top rails to below the pen side rails when the top is in its highest position.

The top 11 is applied to the pen 3 simply by inserting the eyebolt shafts in the frame back holes, and then inserting the support arms 131 in a desired one of the frame side holes 135. The top frame 11 is not secured to the pen frame 5, so that it can be quickly and easily lifted off the pen frame should the master need instant access to the dogs in the enclosure 1.

As can be appreciated, the enclosure 1 of the present invention can be used throughout the various stages of a pets life. The use of the easily removable top 11 and whelping rail 13 make adapting the enclosure 1 for birthing and nursing of puppies simple and quick. The unique gate construction allows for the master to control the egress and ingress of pets, and especially of puppies, by raising and lowering the gate a desired amount. The wall height of the pen 5 allows for a mother dog to see into the pen to check on her puppies. Younger puppies can see outside the pen primarily by looking over the lowered gate.

As various changes could be made in the above constructions without departing from the scope of the invention, it is intended that all matter contained in the above description or shown in the accompanying drawings shall be interpreted as illustrative and not in a limiting sense. Although nuts and bolts are used to hold the frame members together, they can be held together in other fashions. For example, a spring mounted finger in the ends 25 of the vertical side members 23 can be received in corresponding holes in the horizontal frame members. The frame members would be pushed together until the spring biased finger is brought into alignment with the corresponding hole, and the finger would pop into the hole, thereby preventing the frame members from inadvertently being separated from each other. The finger could then be pressed down to disassemble the frame 5. Alternatively, the spring biased finger could be replaced with a screw-down friction lock. The frame cover 9 could be secured to the frame in other fashions. For example, the pockets 53 could be eliminated, and the fabric forming the cover could be extended to be folded around the pen frame members. Fasteners, such as hook and loop fasteners or snaps, for example, could be used to form channels around the frame members to hold the cover 9 to the frame top. Additionally, the ties 53 could be replaced with fabric strips having snaps, Velcro®, etc. at their ends. Although eyebolts are preferred as the hinges, other types of hinge elements, such as plastic extrusions, could also be used to connect the pen frame walls together and to hingedly and removably mount the top to the pen frame. The gate can alternatively comprise an accordioned or folded screen which is secured to the bottom bar of the gate frame and which includes a top bar. The top bar would be provided with snaps, pins, or other equivalent means for securing the gate in a desired position. These examples are merely illustrative.

What is claimed is:

1. An animal enclosure comprising two side walls, a rear wall, a front wall, and a gate in one of the walls; the gate having a vertically movable gate closure which is positionable to a desired degree of openness between a raised position in which the gate is closed, a lowered position in which the gate is opened; said enclosure walls comprising vertical and horizontal members to form a frame, said enclosure walls being hingedly connected together by a connector which extends between adjacent frame members of adjacent walls; the frame member of at least one of a pair of adjacent walls being rotatable relative to the connector; the enclosure being selectively movable between an open position and a folded position; said enclosure further including a brace extending between adjacent walls to maintain said enclosure in said open position; said brace including a first end connected to one wall of said enclosure and a second end connected to an adjacent wall of said enclosure; at least one end of said brace being movable relative to the wall to which the brace is connected to enable the enclosure to be moved from its opened to its closed position.

2. The enclosure of claim 1 wherein the gate comprises a pair of generally vertically extending tracks defining a pair of opposed channels.

3. The enclosure of claim 2 wherein said gate closure comprises a plurality of slats which are slidably and stackably received in said opposed channels.

4. An animal enclosure comprising two side walls, a rear wall, a front wall, and a gate in one of the walls; the gate comprising a pair of generally vertically extending tracks defining a pair of opposed channels and a vertically movable gate closure; said gate closure being positionable to a desired degree of openness between a raised position in which the gate is closed, a lowered position in which the gate is opened; said gate closure having a top edge, said gate top edge being hard and defining a smooth surface across the top of the gate; said gate closure comprising a flexible panel which is slidably received in said track channels and a lock on said track, said lock engaging said flexible panel to secure said panel at a desired position.

5. The enclosure of claim 4 including a hole in at least one of said tracks and a plurality of spaced apart holes in said flexible panel; said holes in said panel being positioned to be alignable with said hole in said track; said lock including a spring-biased finger which extends through said track hole and a selected hole of said flexible panel to hold said panel in a desired position relative to said track;

said at least one hole is in said panel and said at least one hole comprises a plurality of spaced apart holes; said finger being in said track; said finger being a spring biased finger and being external of said track.

6. The enclosure of claim 5 wherein said panel holes are received within said track; said track having an opening communicating with said channel, said finger extending through said channel to cooperate with said panel holes.

7. The enclosure of claim 1 wherein said enclosure includes a pen cover which covers said frame; said pen cover being removably mountable on said frame.

8. An animal enclosure comprising two side walls, a rear wall, a front wall, and a gate in one of the walls; the gate having a vertically movable gate closure which is positionable to a desired degree of openness between a raised position in which the gate is closed, a lowered position in which the gate is opened; said gate closure having a top edge, said gate top edge being hard and defining a smooth surface across the top of the gate; the walls comprising vertical and horizontal members to form a frame, said enclosure including a pen cover which covers said frame; said pen cover being removably mountable on said frame; the pen cover including downwardly facing pockets along upper edges thereof; said pockets being sized to fit over the frame members.

9. An animal enclosure comprising two side walls, a rear wall, a front wall, a top and a gate in one of the walls; the gate having a vertically movable gate closure which is positionable to a desired degree of openness between a raised position in which the gate is closed, a lowered position in which the gate is opened; said gate closure having a top edge, said gate top edge being hard and defining a smooth surface across the top of the gate; said enclosure top having a back edge, a front edge, and side edges; said enclosure further including a pair of pivotal support arms spaced rearwardly of said front edge of said top; said top being hingedly connected to one of said enclosure walls at said top back edge; said support arms each including a free end, said support arm free ends being selectively positionable on said enclosure, such that said top can be angled to a desired degree.

10. The enclosure of claim 9 wherein said enclosure includes a plurality of holes in a top edge of said enclosure side walls, said support arms being received in selective ones of said holes.

11. The enclosure of claim 9 wherein the top includes side panels which depend from said top side edges to overlap the side walls of said enclosure.

12. An animal enclosure including a pen and a top for said pen; said pen including front, back, and side walls, said pen walls having top edges; said top including front, back, and side edges; said top being hingedly connected to said pen along its back edge to said pen walls and including a pair of pivotable support arms spaced rearwardly from said front edge of said top; said support arms having a free end which is selectively positioned in one of a plurality of positions along said pen side walls to position said top to a desired degree of openness.

13. The animal enclosure of claim 12 wherein said top is removably mounted to said pen; said top being hingedly mounted to said pen by a hinge.

14. The animal enclosure of claim 13 wherein said hinge includes a shaft; said hinge shaft being slidably received in a hole in said pen wall.

15. The animal enclosure of claim 14 wherein top includes a frame, and a cover for said frame, said hinge including an annular head through which a member of said frame is rotatably journaled; said shaft extending from said head.

16. The animal enclosure of claim 13 wherein said hinge includes two connected sections, each said section defining a cylinder having an opening along a wall thereof, said openings being sized such that said cylinders snappingly receive said back edge of said top and said top edge of said pen, said hinge snappingly connecting said top to said pen.

17. The animal enclosure of claim 12 wherein the top has a front-to-back width shorter than the front-to-back width of the pen.

18. The animal enclosure of claim 12 wherein the top includes side flaps, said side flaps depending from said cover sides to a point below the top edge of said pen side walls.

19. The animal enclosure of claim 12 wherein said top is made from a top frame and a panel which extends over said frame; said panel being removably mounted to said top frame.

20. The animal enclosure of claim 19 wherein said panel is a cloth panel.

21. The animal enclosure of claim 12 including a whelping rail which is removably received in said pen.

22. The animal enclosure of claim 21 wherein said whelping rail comprises a frame having a bar member and legs extending diagonally downwardly and outwardly from said bar, said legs supporting said bar above a bottom of said pen and inwardly from said pen walls.

23. An animal enclosure comprising two side walls, a rear wall, a front wall, and a gate in the front wall; the gate having a panel movable vertically between a raised position in which the gate is closed and a lowered position in which the gate is opened; said gate being selectively positionable at a desired position between said raised and lowered positions; said enclosure further including a whelping rail; said whelping rail comprising a frame having a bar member and legs extending diagonally downwardly and outwardly from said bar, said legs supporting said bar above a bottom of said pen and inwardly from said pen walls.

24. An animal enclosure comprising two side walls, a rear wall, a front wall, and a gate in the front wall; the gate having a panel movable vertically between a raised position in which the gate is closed and a lowered position in which the gate is opened; said gate being selectively positionable at a desired position between said raised and lowered positions; said enclosure including a fastener for securing said gate panel at said desired position; said gate comprising a pair of side members and a track on said side members; said panel being slidable through said track; said panel including a plurality of spaced apart openings proximate said track; said fastener comprising a pin which operatively mounted to one of said gate side members or track members; said pin being received in a selective one of said panel openings to secure said gate in a desired position.

25. The enclosure of claim 24 wherein said pin is spring biased.

26. An animal enclosure including a pen and a top for said pen;
said pen including front, back, side walls, and a gate in one of said walls; said pen walls having top edges; said top including front, back, and side edges; the gate having a closure member movable vertically between a raised position in which the gate is closed and a lowered position in which the gate is opened; said gate being selectively positionable at a desired position between said raised and lowered positions;
said top being having front, back, and side edges; said top being hingedly connected along one of said edges to one of said pen walls and including a pair of pivotable support arms; said support arms having a free end which is selectively positioned in one of a plurality of positions on said pen side to position said top to a desired degree of openness.

27. The animal enclosure of claim 26 wherein said top is removable from said pen.

28. The animal enclosure of claim 26 wherein the walls of said enclosure are of a height sufficient to contain the puppies within the enclosure, but allow access to them by a mother dog from outside the enclosure.

29. The animal enclosure of claim 26 wherein the gate can be adjusted to a height which allows for puppies within the enclosure to have visual access to activities outside of the enclosure to aid in the socialization process of the puppies.

30. The enclosure of claim 1 wherein said connectors each comprise a web and a pair of cylinders on opposite sides of said web; said cylinders each including an elongate slot sized to enable the frame member to be snappingly received in said cylinder; said cylinder being sized to rotatably receive said frame member.

31. The animal enclosure of claim 23 wherein said whelping rail is removably received in said enclosure.

\* \* \* \* \*